Dec. 23, 1958 M. L. EDWARDS 2,865,539
TANK AND REPLACEABLE MOTOR DRIVEN PUMP ASSEMBLY
Filed March 23, 1955 4 Sheets-Sheet 1
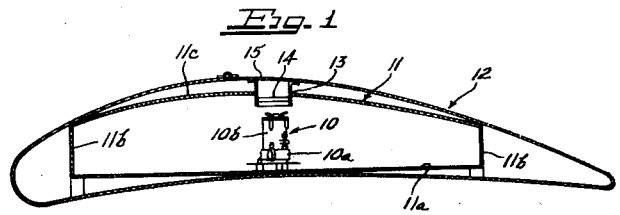
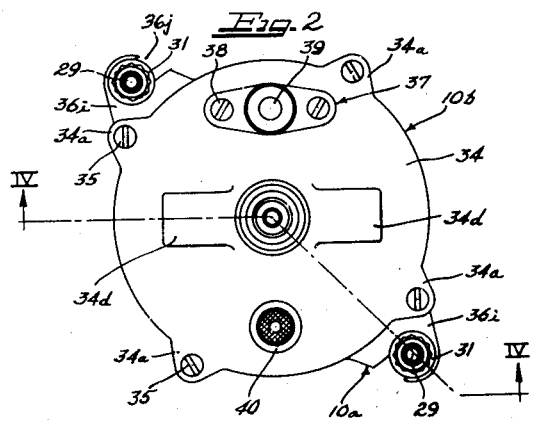
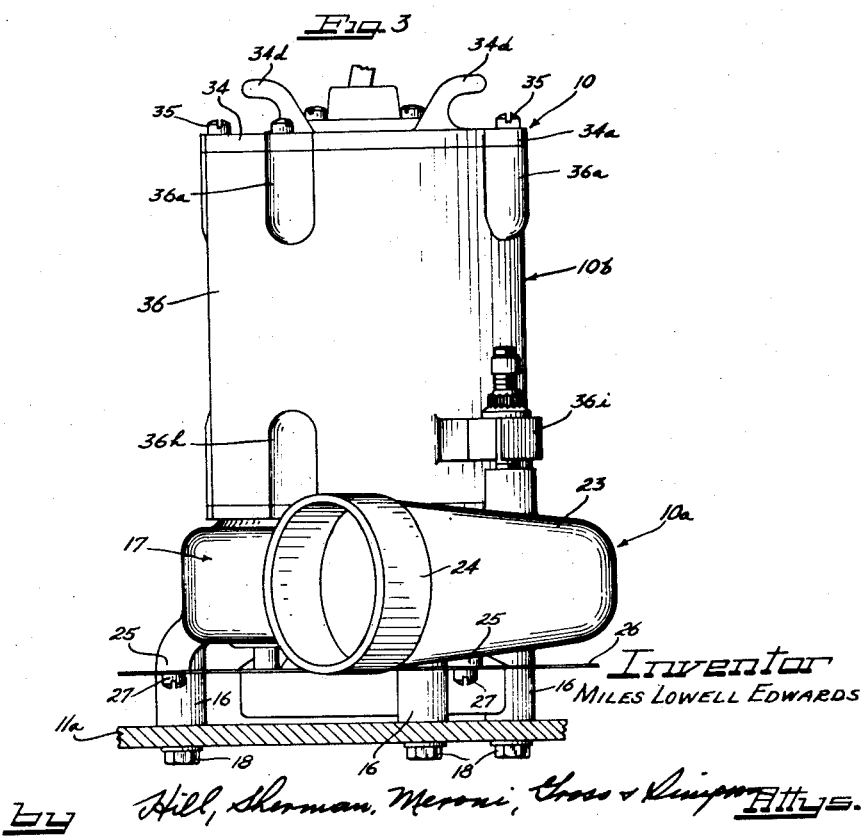
Inventor
MILES LOWELL EDWARDS
by Hill, Sherman, Meroni, Gross & Simpson Attys.

Inventor
MILES LOWELL EDWARDS

Dec. 23, 1958 M. L. EDWARDS 2,865,539
TANK AND REPLACEABLE MOTOR DRIVEN PUMP ASSEMBLY
Filed March 23, 1955 4 Sheets-Sheet 3
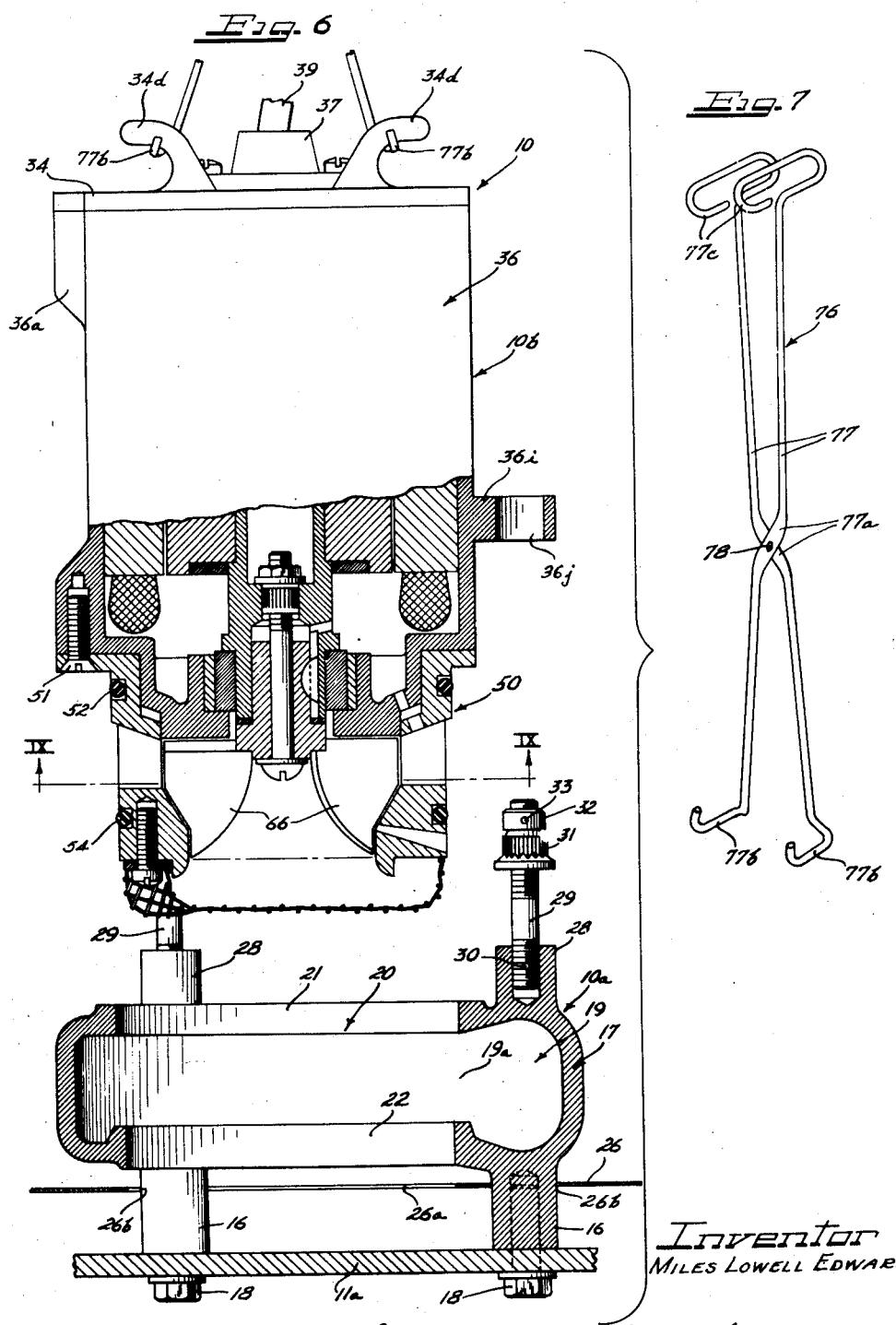
Inventor
MILES LOWELL EDWARDS Dec. 23, 1958 M. L. EDWARDS 2,865,539
TANK AND REPLACEABLE MOTOR DRIVEN PUMP ASSEMBLY
Filed March 23, 1955 4 Sheets-Sheet 4
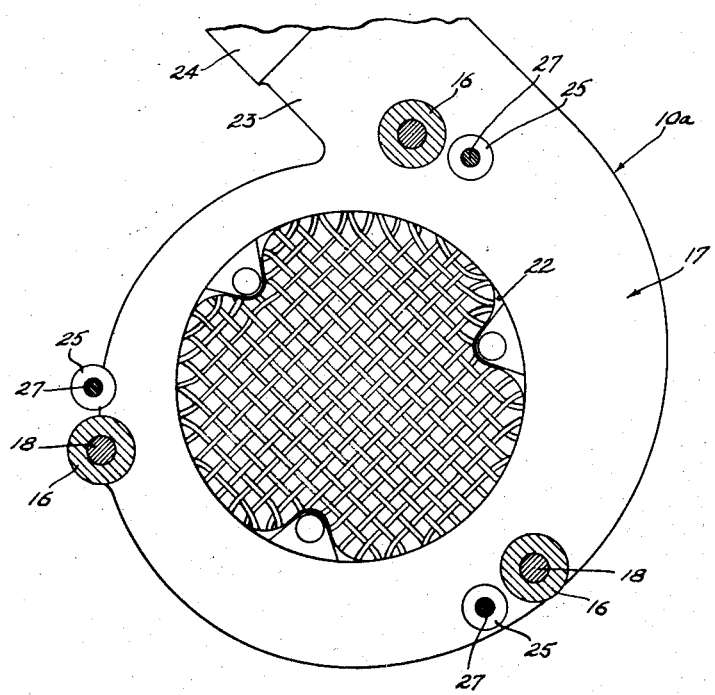
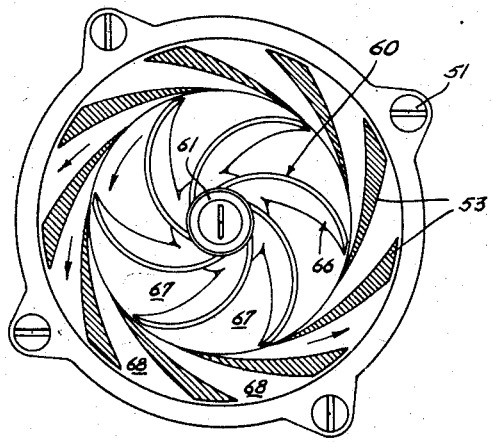
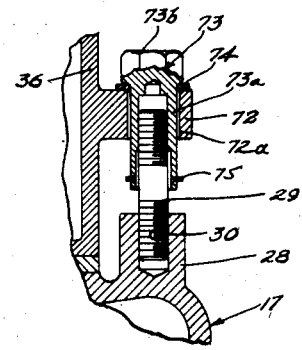
Inventor
MILES LOWELL EDWARDS United States Patent Office 2,865,539
Patented Dec. 23, 1958

2,865,539

TANK AND REPLACEABLE MOTOR DRIVEN PUMP ASSEMBLY

Miles Lowell Edwards, Portland, Oreg.

Application March 23, 1955, Serial No. 496,265

17 Claims. (Cl. 222—333)

This invention relates to a tank and submerged pump assembly wherein the pump can be replaced without draining the tank. Specifically, this invention relates to an aircraft fuel cell and booster pump assembly having a volute body fixedly mounted in the tank and cooperating with a replaceable pump and motor unit that can be inserted into and removed from the tank through an opening that is too small to accommodate the volute body.

According to this invention there is provided a plug-in type of booster pump that can be inserted into and removed from tanks or the like cells or enclosures without disturbing the contents of the tank or the like. Heretofore, booster pumps have been mounted on the bottoms of fuel cells or tanks and could only be replaced or removed for service after the tank had been drained. Frequently, the drainage problem was more costly and time consuming than the repair work on the pump. Attempts to suspend the pumps from the top walls of the tanks in order that they might be removed without draining the tanks, have not been very successful because of vibration problems, reinforcement requirements for the top walls and required large diameter openings in the tanks.

The present invention now makes possible utilization of a pump mounting on the bottom wall of the tank and a relatively small diameter opening in the top wall of the tank above the mounting to accommodate insertion of a pump and motor unit that can be easily plugged in or coupled with the mounting.

The invention includes a pump part affixed to the bottom tank wall and defining the pump volute chamber and discharge outlet coupling. A central opening through this pump part removably receives a small diameter pump casing part that has the inlet throat ring, the pump motor, and a ring of diffuser vanes therein. Seals are provided so that the discharge from the diffuser vanes is directed into the volute chamber. A small diameter electric motor casing carries the pump casing as an integral part thereof and has ears or lugs thereon for coacting with coupling means to fixedly attach the pump and motor unit to the tank mounting part. These mounting means are operated through the opening in the top of the tank. To facilitate insertion and removal of the pump and motor unit, ears are provided on top of the motor casing to receive tongs or the like tool.

A feature of the invention, therefore, includes the division of the pump into a volute housing part which can be of any size and which will not wear out so that it can be permanently mounted in a tank with a permanent connection to an outlet pipe or tube, and a plug-in pump part containing all of the wearable and movable elements of the assembly confined in a small diameter housing that is easily removed from a tank through a small opening.

Another feature of the invention deals with a booster pump and motor unit having a reduced length which is made possible by a hollow motor shaft receiving the pump rotor stem or hub and surrounded by a common bearing for the shaft and rotor. The nested parts can thus be confined in a space having much less height than was heretofore required.

Another feature of this invention is the combination of a mixed flow pump impeller with a ring of diffuser vanes and the provision of openings around the impeller downstream from the pump inlet to form secondary inlets at high rates of flow and to form vapor outlets when normal diffuser action occurs at low rates of flow.

A still further feature of this invention is to provide a submerged pump assembly that can be serviced through a relatively small opening without disturbing liquid surrounding the pump.

An object of this invention is to provide a plug-in type booster pump that is easily coupled to a mounting in a tank without draining the tank.

Another object of the invention is to provide a motor driven booster pump with a tank mounted volute housing and an easily detachable pump and motor unit that can be received through a small hole in the upper portion of the tank.

Another object of this invention is to provide a plug-in type pump with separable volute chamber housing and pump and motor units that are easily coupled together in sealed relation.

A still further object of this invention is to provide a plug-in type of pump having a ring of diffuser vanes protecting the pump rotor.

Other and further objects of the invention will be apparent to those skilled in the art from the following detailed description of the annexed sheets of drawings which illustrate a preferred embodiment of the invention.

On the drawings:

Figure 1 is a somewhat diagrammatic transverse cross-sectional view through an airplane wing and fuel cell showing the pump assembly of this invention mounted in the cell.

Figure 2 is a top plan view of the pump and motor assembly shown in Figure 1.

Figure 3 is a side elevational view of the pump and motor assembly.

Figure 6 is an exploded elevational view, partly in vertical section and illustrating the manner in which the plug-in portion of the pump is insertable into the tank mounted portion of the pump.

Figure 7 is a perspective view of the tongs for inserting and removing the plug-in portion of the pump.

Figure 8 is a bottom plan view, with parts in horizontal section, taken along the line VIII—VIII of Figure 4.

Figure 9 is a transverse cross-sectional view, with parts in plan, taken along the line IX—IX of Figure 6.

Figure 10 is a fragmentary vertical cross-sectional view of a modified form of coupling.

As shown on the drawings:

Figure 4:
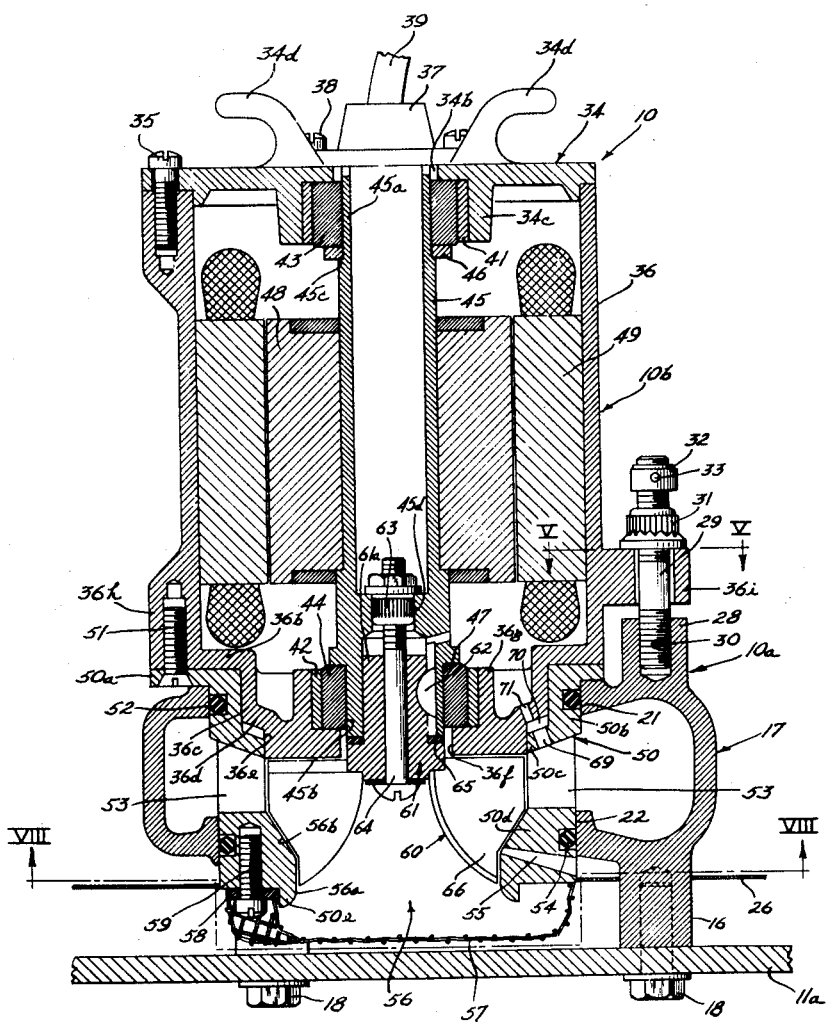
Figure 4 is a vertical cross-sectional view taken along the line IV—IV of Figure 2.
Figure 5:
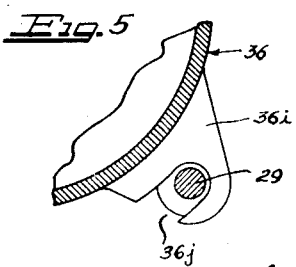
Figure 5 is a fragmentary horizontal cross-sectional view taken along the line V—V of Figure 4.

The booster pump assembly 10 of this invention is illustrated in Figure 1 as submerged in a wing tank or cell 11 positioned inside of an airplane wing 12. The tank 11 has a bottom wall 11a, side walls 11b, and a top wall 11c, all confined within the wing 12. The top wall 11c has a filler neck 13 closed by a conventional plug 14 and the upper skin of the wing 12 has a door 15 overlying the filler neck 13.

The assembly 10 of this invention includes a part 10a that is permanently mounted on the bottom wall 11a of the tank and a plug-in part 10b that is removably carried by the part 10a and insertable through the filler neck 13.

As shown in Figures 3, 4, 6 and 8, the part 10a has a plurality, preferably three, of legs or mounting posts 16 depending from the bottom of an annular casing 17. These legs 16 rest on the bottom wall 11a of the tank and receive cap screws 18 carried by the tank to fixedly secure the part on the bottom of the tank.

The casing 17 defines an annular volute or pumping chamber 19 around a central open-ended cylindrical portion 20 having a large diameter cylindrical wall 21 at the top thereof and a smaller diameter cylindrical wall 22 at the bottom thereof. The chamber 19 is open around its entire inner periphery and the entrance mouth 19a lies between the walls 21 and 22. The casing 17 has a tangential discharge outlet 23 on the outer periphery thereof communicating with the volute chamber and having a boss 24 at the outer end thereof for receiving a discharge conduit (not shown). Mounting pads 25 are provided on the bottom of the casing 17 preferably adjacent the legs or posts 16 to receive thereagainst a flat metal baffle ring 26 having a central opening 26a aligned with the cylindrical wall 22 and openings 26b receiving the legs 16 therethrough. Cap screws 27 threaded into the pads 25 mount the baffle in position. The baffle ring 26 extends outwardly beyond the periphery of the casing 17 for a purpose to be more fully hereinafter described.

The top of the casing 17 has a pair of diametrically opposed legs or posts 28 projecting upwardly therefrom and tapped to receive studs 29. Pins 30 hold the studs 29 in non-rotatable threaded engagement in the legs. The studs have threaded upper ends receiving nuts 31 with peripheries adapted to be engaged by a socket wrench. Lock nuts 32 have smaller outside diameters than the nuts 31 and are threaded on the top ends of the studs 29 and are locked thereon by pins 33. The nuts 31 are, therefore, adjustably threaded on the open ends of the studs but are held against removal from the studs by the pinned on lock nuts 32.

The posts or legs 28 are spaced outwardly from the cylindrical wall 21 of the casing 17 but inwardly from the outer wall of the casing.

The baffle ring 26 is held by the lower faces of the pads 25 in spaced relation beneath the cylindrical wall 22 of the casing.

The part 10b as shown in Figures 2, 3, 4 and 6, includes a motor casing having a circular top wall or head 34 with ears 34a at spaced intervals around the periphery thereof receiving cap screws 35. The end head 34 overlies a cylindrical casing or main body 36 with bosses 36a underlying the ears 34a and having the cap screws 35 threaded therein to fixedly mount the end head on the top end thereof.

As best shown in Figure 4, the end head 34 is centrally apertured at 34b and has a depending annular boss 34c surrounding the opening 34b. Diametrically opposed hook-like fingers 34d are provided on the top of the head 34 on opposite sides of the central opening 34b. A cable fitting 37 is attached to the top of the head 34 by means of screws 38 for affixing an electric cable 39 to supply current to the motor inside of the casing. This fitting 37 is provided on one side of the fingers 34d and a screened port 40 is provided on the other side. The screen or other filter for the port 40 acts as a fire or explosion barrier while accommodating flow of liquid out of the motor casing when the motor is completely submerged in the fuel contained in the tank 11. The motor bearings are lubricated by the fuel and the fuel serves as a coolant for the motor.

The cylindrical casing 36, as best shown in Figures 4 and 6, has an integral bottom end head 36b extending radially inward from the side wall thereof to a reduced diameter neck 36c terminating in an inturned sloping rim 36d. The rim extends to a reduced diameter cylindrical portion 36e having a flat bottom with a central opening 36f. An upstanding annular boss 36g is provided on the end portion 36e surrounding the opening 36f. The bottom end of the casing has bosses 36h aligned with the bosses 36a and internally tapped like the bosses 36a.

A bearing sleeve 41 is pressed in the annular boss 34c of the end head 34 and a second similar sleeve 42 is pressed in the boss 36g. A bearing ring 43 is mounted in the sleeve 41 and a bearing ring 44 is mounted in the sleeve 42. These rings can be replaced with cages or anti-friction bearings if desired.

A hollow shaft 45 has a reduced diameter top end 45a in the bearing ring 43 and a reduced diameter bottom end 45b in the bearing ring 44. A collar ring 46 seated on the shoulder 45c at the bottom of the reduced diameter shaft portion 45a underlies the bearing ring 43 in bearing engagement therein and an integral collar 47 on the shaft overlies the bearing ring 44 to cooperate with the collar 46 in holding the shaft against axial displacement and affording thrust bearings for the shaft. A motor armature 48 is wound around the shaft 45 between the collars 46 and 47 thereof. A motor field 49 surrounds the armature 48 and is mounted in the casing 36.

The bottom of the casing 36 carries a pump casing 50 which has a flat peripheral top flange 50a underlying the casing end wall 36b and attached thereto by cap screws 51 threaded into the bosses 36h. The pump casing 50 has a cylindrical side wall 50b adjacent the flange 50a and grooved to receive a rubber sealing ring 52. This side wall 50b snugly fits in the cylindrical wall 21b of the volute casing 17 with the sealing ring 52 sealingly engaging this wall.

The pump casing wall 50b has an inclined rim portion 50c overlying the rim 36d and apertured to receive the portion 36e of the casing end.

A ring of diffuser vanes 53 depends from the wall 50c in circumferentially spaced relation and joins the wall 50c with the bottom ring portion 50d of smaller diameter than the portion 50b to fit snugly in the cylindrical wall 22 of the volute casing 17. This ring portion 50d is grooved to receive a rubber sealing ring 54.

The ring portion 50d, as shown in Figure 4, extends beneath the bottom wall of the volute casing and has passages 55 therethrough opening above the baffle ring 26.

The bottom of the ring portion 50d of the casing 50 has a lip 50e defining an inlet 56 for the pump. A screen 57 spans the inlet mouth 56 and is carried by a mounting ring 58 which surrounds the lip 50e and is secured to the pump casing by screws 59. The pump inlet 56 has a cylindrical entrance portion 56a and a diverging portion 56b extending to the inner ends of the diffuser vanes 53. The diffuser vanes have outer ends registering with the mouth 19a of the volute chamber.

The pump rotor 60 includes a central hub 61 with a stem-like shank 61a extending into the lower hollow end of the motor shaft 45. The shaft is grooved to receive a key 62 on the shank 61a to lock the shaft and stem against radial displacement. The shaft 45 has a thickened intermediate portion 45d having a nut 63 pressed and splined therein and receiving a bolt 64 extending through the hub. The nut has a head overlying the thickened portion 45d so that the bolt can draw the stem of the hub tightly against a shim or a spacer washer 65 on the end of the shaft. The rotor 60 is thereby centered in the impeller chamber and firmly affixed to the shaft and the insertion of the hub stem or shank into the shaft permits the bearing ring 44 to surround the stem or shank intermediate the ends thereof thereby providing a dual support for the shaft and rotor.

The hub 61 has a ring of pumping vanes 66 depending therefrom and underlying the end 36e of the motor casing. These vanes have exterior contours closely following the inlet walls 56a and 56b and have discharge ends just inwardly from the inner ends of the diffuser vanes 53.

The ring of impeller vanes 66, as shown in Figure 9, radiates from the hub 61 and provides pumping channels 67 therebetween. The vanes 66 have a propeller-like pitch to impart an axial flow to the liquid received from the inlet 56. As the impeller rotates in the direction shown by the arrow of Figure 9, fluid is discharged radially outward from these channels 67 against the inner ends of the diffuser vanes 53 which direct the fluid outwardly through channels 68 between the diffuser vanes.

The fluid then discharges through the mouth 19a of the volute chamber 19 into the chamber and thence to the discharge outlet 23.

At high rates of flow through the pump, an inward flow of liquid through the openings 55 of the pumping casing is induced so that these openings become secondary inlets. However, when low rates of flow occur, as for example, when the demand is lessened, back pressure in the pump causes reverse flow through the openings 55. The openings 55 thereby become vapor outlets and discharge vapors and gases out of the pump above the baffle ring 26 where they will be directed away from the pump inlet. Centrifugal action of the impeller on the fluid in the inlet, creates a reduced pressure zone inside the ring of impeller vanes thereby further inducing vapor separation.

The diffuser ring zone of the pump casing 50 is vented to the interior of the motor casing by the provision of a port 69 in the wall 50c of the casing. This wall overlies the wall 36d of the motor casing to provide therebetween an annular space 70. This space 70 is vented to the motor compartment by a port 71. The arrangement is such that the ports 69 and 71 may be circumferentially displaced but will always be in communication through the space 70 to insure flow of liquid under pressure from the diffuser zone of the pump into the motor compartment to lubricate and cool the motor. The liquid flows upwardly between the motor rotor 48 and stator 49 to submerge the top bearing 43 and then flows out of the motor casing and back to the tank through the screened port 40.

The cylindrical pump casing 36 has diametrically opposed ears 36i on the side wall thereof near the bottom end wall. These ears are slotted at 36j with the slots extending through conforming sides thereof to receive the studs 29 of the casing 17 therein. As illustrated in Figure 2, the slots 36j open in a clockwise direction and the ears 36i fit under the nuts 31.

In the modified arrangement of Figure 10, the casing 36 is provided with ears such as 72, each with a circular bore 72a therethrough. The mounting stud 29 on the volute casing 17 is threaded into a hollow nut 73 which is rotatably mounted in the bore 72a and which is axially restrained so as to be retained in the bore. Thus, the nut 73 has a hollow internally threaded shank 73a freely disposed in the bore 72a and a head 73b overlying the ear 72 with a washer 74 interposed between the head and ear. A snap ring 75 is secured in a groove around the bottom end portion of the shank 73a and projects therefrom to abut the bottom face of the ear and thereby cooperate with the head 73b in retaining the nut in the bore 72a.

As shown in Figure 7, a pair of tongs 76 are provided for handling the pump part 10b in the tank 11. These tongs 76 include a pair of rods 77 having flattened offset intermediate portions 77a pivoted together by a pin 78. The rods cross over each other at the flattened portion 77a. The lower ends of the rods are bent to form hooks 77b to engage the fingers 34d of the pump part 10b as shown in Figure 6. The upper ends of the rods are bent to form handles 77c.

To engage the tongs with the fingers 34d, it is only necessary to separate the handles 77c sufficiently to spread the hooks 77b so that they can slip over the ends of the fingers 34d. Drawing the handles 77c toward each other will securely tighten the hooks on the fingers. The hooks have upturned extremities so that the pump part 10b will rotate when the tongs are rotated.

Operation

The pump part 10a is installed in the bottom wall 11a of the tank 11 at the time of fabrication of the tank and thereby becomes a permanent part of the tank and can have a permanent connection with the tank outlet pipe or tube. Heretofore, replacement of a tank mounted pump has required uncoupling of pipe or hose connections. The part 10 is preferably aligned with the filler neck 13 of the tank or can be placed adjacent a hand opening in the side wall of the tank.

The part 10b is lowered into the tank through the filler neck 13 with the aid of the pair of tongs 76. The tongs can be easily manipulated so as to swing ears 36i into position for directing studs 29 into the slots 36j or for inserting the studs into the hollow nuts 73. A socket wrench can then easily be inserted through the neck 13 to tighten the nuts 31 or 73 thereby drawing the part 10b into fully seated position in the part 10a with the seal rings 52 and 54 sealingly engaging the cylindrical walls 21 and 22. In this position, the pump casing 50 will be bottomed on the top wall of the volute casing 17 and the pump inlet screen will project through the baffle disk to lie closely adjacent the bottom tank wall 11a as shown in Figure 4.

To remove the part 10b, it is then only necessary to loosen the nuts 31 or 73 with the socket wrench, to engage the fingers 34d with the tongs 76 and to withdraw the part 10b out through the neck 13.

The pump operates by receiving fluid such as gasoline, jet engine fuel, or the like, from the bottom portion of the tank 11 through the screen 57. The fuel is pumped by the pumping vanes 66 of the impeller 60. As explained above, these vanes are axially pitched and the rotor is, therefore, of the mixed flow type. At high rates of flow, fuel will be drawn in through the openings 55 to merge with the fuel from the inlet mouth 56. At lower rates of flow, fuel will flow outwardly through the openings 55 above the baffle ring 26 thereby preventing the pump from becoming gasbound.

The motor of the part 10b is submerged in the fuel and is cooled and lubricated by fuel flowing through the motor compartment and out of the part 40. The fuel is supplied to the motor casing under pressure from the port 69 in the diffuser zone.

From the above description it should, therefore, be understood that there is now provided a plug-in type of pump and motor unit which can be easily inserted into and removed from a tank or other enclosure without draining its contents and without requiring a large diameter opening.

It will be understood that variations and modifications may be effected without departing from the scope of the novel concepts of this invention.

I claim as my invention:

1. A pump assembly comprising an annular pump volute casing having a central aperture therethrough and a centrifugal pumping chamber surrounding the aperture in full communication therewith around the entire circumference thereof, mounting posts depending from said volute casing for supporting the casing in spaced relation from a tank wall or the like, a pump and motor assembly including a pump casing insertable through the central aperture of the volute casing and a motor carrying casing on said pump casing adapted to project above the volute casing, said pump casing defining an inlet to the pump and an impeller chamber between the inlet and the volute of the volute casing, a motor driven centrifugal impeller rotatably mounted in said impeller chamber, a ring of stationary diffuser vanes surrounding the impeller defining diffuser passages, said passages discharging into the volute of the volute casing, seal means between the volute casing and the pump casing, studs projecting upwardly from the volute casing, ears on the motor casing adapted to receive said studs, and nuts threadable on the studs to act on the ears for attaching the pump and motor assembly to the volute casing.

2. A combination plug-in submerged booster pump and mounting member for fuel cells having top, bottom and side wall portions, said mounting member comprising an annular volute casing having a central aperture therethrough and mounting posts depending therefrom for attachment to a wall of said fuel cell, a pump and motor unit including a motor, a plug-in pump part insertable through said aperture of the volute casing, said pump part having an inlet opening surrounded by the mounting legs of the volute casing, a centrifugal outlet discharging radially into the volute chamber of the volute casing, an impeller chamber between the inlet and outlet, a centrifugal impeller in said impeller chamber having a hub attached to the motor and a ring of mixed flow pumping vanes with inlet ends in the inlet opening and outlet ends registering with the volute, seal means carried by the pump part for coacting with the aperture defining walls of the volute casing, and cooperating coupling parts respectively carried by the volute casing and motor for uniting the pump and motor unit with the volute casing, said coupling means being manipulated from the top of the cell whereby the pump and motor unit can be plugged into the volute casing without draining the contents of the cell.

3. A combination plug-in pump motor assembly and pump casing adapted for mounting in the bottom of a fuel cell, or the like, said pump casing and having an annular pumping chamber surrounding a central aperture and equipped with a peripheral discharge outlet, a pump and motor unit including a pump part at one end insertable through the central aperture of the casing and a motor at the other end for driving the pump, said one end of the pump part having an inlet for receiving fluid from the cell in which the casing is mounted and an outlet for communicating with the pumping chamber, said pump part having a vent upstream from the pumping chamber to release gases in the pump back to the cell, and detachable coupling parts respectively carried by the motor and casing and being accessible from the top of the tank, said motor and pump unit being of smaller diameter than the pump casing and insertable through a small opening in the top of the tank whereby the pump and motor unit can be inserted into and removed from the tank without draining the contents of the tank and without requiring a large opening in the tank.

4. In combination, a tank having a bottom wall and a top wall with an opening therethrough, a pump casing fixedly mounted on said bottom wall under said opening, said pump casing having mounting legs attached to said bottom wall holding the casing above the bottom wall to accommodate flow under the casing, said casing having an annular volute chamber surrounding a central opening therethrough and a peripheral outlet on the outer circumference of the casing, a pump and motor unit insertable through the opening in the top of the tank wall and having a pump part snugly fitting the aperture of the pump casing and providing a pump inlet communicating with the space under the pump casing and a pump outlet communicating with the volute chamber of the casing, coupling parts carried by the pump casing and the pump and motor unit, and said coupling parts being operated through the opening in the top wall of the tank whereby the pump and motor unit can be plugged into and removed from the pump casing without draining the contents of the tank.

5. A pump and motor assembly which comprises a first pump casing having an annular pumping chamber with a peripheral discharge and a central opening communicating with the inner periphery thereof, a second pump casing snugly received in said central opening and having seal rings coacting with the walls defining said opening to sealingly connect the parts, said second pump casing having an axial inlet and a peripheral outlet registering with the pumping chamber, a motor casing on said second pump casing, a motor in said motor casing having a drive shaft, a pump impeller having a hub affixed to said drive shaft, said pump impeller including a ring of pumping vanes mounted in said second pump casing with inlet ends at the inlet of the second casing and outlet ends discharging into the pumping chamber, and a bearing for the motor shaft surrounding the hub of the impeller.

6. A pump assembly which comprises a volute casing, an insert pump casing removably received in said volute casing, said insert casing having an axial inlet opening and a radial discharge communicating with the volute chamber, said insert casing having a ring of radial openings adjacent the axial inlet and communicating with the inlet, and said openings providing a secondary inlet at high rates of flow through the pump and providing a vapor outlet at low rates of flow.

7. A pump assembly which comprises a casing defining an annular pumping chamber surrounding a central aperture, a ring of diffuser vanes in said aperture discharging into the pumping chamber, a motor casing, a drive shaft rotatably carried from said casing, bearings in said casing supporting said drive shaft, an impeller surrounded by said diffuser vanes having a hub attached to the drive shaft, and a vent connecting a space between a pair of diffuser vanes with the space in the motor casing containing the bearings whereby said bearings will be lubricated with fluid bled from said diffuser vanes.

8. A submerged booster pump assembly which comprises a pump casing having depending mounting legs, a bottom inlet, and a circumferential pumping chamber with a peripheral outlet, a baffle surrounding said inlet and projecting therefrom beyond the mounting legs, and radially extending openings in said inlet and discharging on the opposite face of the baffle plate from the inlet, said radial opening accommodating release of vapors from the pump and flow of liquid into the pump.

9. A pump assembly having an axial inlet, an impeller chamber adjacent the inlet, a ring of stationary diffuser vanes surrounding the impeller chamber, a pumping chamber surrounding the diffuser vanes, a ring of impeller vanes in the impeller chamber having inner edges receiving fluid from the inlet and outer edges discharging to the diffuser vanes, and additional openings surrounding the inlet feeding the impeller when the diffuser vanes pass liquid at high flow rates and discharging vapors from the impeller when the diffuser vanes are effective to maintain low flow rates.

10. A plug-in pump assembly adapted for installation in a fuel cell or the like through a small opening which comprises a casing defining an annular pumping chamber surrounding and in communication with a pump-receiving chamber, means on said casing for supporting the casing in fixed position in a fuel cell or the like with the pump-receiving chamber spaced from the cell walls, a pump and motor unit of lesser diameter than said casing including a pump body sized for fitting snugly in said receiving chamber of the casing, said body having an axial inlet and a circumferential outlet with an impeller chamber therebetween, a pump impeller in said impeller chamber encased in said body, a screen on said body spanning the axial inlet thereof, said body and screen surrounding the impeller in protecting relation, a motor on said body driving said impeller in the impeller chamber to propel fluids from the axial inlet through the circumferential outlet of the body, and means for detachably connecting the casing and unit with the circumferential outlet of the body surrounded by and in registration with the pumping chamber of the casing whereby the lesser diameter unit may be plugged into and removed from the casing and may be passed through a small diameter access opening in a fuel cell or the like without exposing the impeller.

11. A plug-in pump assembly comprising a centrally apertured casing defining an annular pumping chamber surrounding and in communication with the central aperture, a peripheral outlet on said casing for said pumping chamber for attachment to a conduit, a pump and motor unit of lesser diameter than said casing including a pump body fitting in said central aperture and having a ring of diffuser vanes for registering with the pumping chamber of the casing to direct fluid into said pumping chamber, said body also having an inlet and an impeller chamber receiving fluid from said inlet, a pump impeller driven by said motor and mounted in said impeller chamber for pumping fluid from the inlet of the body to the diffuser vanes and into the pumping chamber for discharge through the peripheral outlet of the pumping chamber, said body surrounding and protecting said impeller from damage, and means for detachably connecting the casing and unit whereby the smaller diameter unit can be plugged into and removed from the larger casing and passed through a relatively small diameter access opening in a tank or the like without exposing the impeller.

12. A submerged-type pump and motor unit for mounting in a tank on a tank wall which comprises a first pump part defining an annular pumping chamber and having a central aperture therethrough in communication with said pumping chamber together with a peripheral outlet for said pumping chamber, mounting means on said first pump part for fixedly attaching said part inside of a tank on a wall of the tank, a pump and motor unit having a second pump part insertable in said central aperture of the first pump part to receive fluid from the tank and to discharge fluid into the pumping chamber surrounding the aperture of said first pump part, said unit having a motor part, attachment members on said motor part adapted to overlie the first pump part, means venting the interior of the second pump part to the tank to prevent the pump from becoming gas-bound, and coupling means operative from within the tank at a level above the bottom of the tank for connecting the attachment members of the pump and motor unit to the first pump part for uniting the unit therewith whereby the unit is readily plugged into the first pump part.

13. A combination pump and fuel cell assembly adapted to pump fully liquid fuel from a fuel cell which comprises a first pump part defining a pumping chamber and an outlet for liquid being pumped, means for mounting said first pump part in a fuel cell on an interior wall thereof, a second pump part adapted to be plugged into the first pump part and having an inlet for receiving fuel directly from said cell together with a peripheral outlet to discharge the fuel into said pumping chamber and thereby provide a complete pump, coupling means on the first and second pump parts adapted to be manipulated from the outside of a fuel cell containing the first and second pump parts for detachably uniting said parts whereby the second pump part can be inserted and removed through a small opening in the upper portion of the cell without draining the contents thereof, and means between the inlet of the second pump part and the pumping chamber of the first pump part venting fluid back to the fuel cell to prevent the pump from becoming gas-bound.

14. A plug-in pump assembly adapted for installation in a tank or the like through a small opening which comprises a casing defining a pumping chamber surrounding and in communication with a pump receiving chamber, means on said casing for supporting the casing in fixed position in a tank or the like with the pump receiving chamber spaced from the walls of the tank, a pump and motor unit of lesser diameter than said casing including a pump part sized for fitting snugly in said receiving chamber of the casing, said pump part having an axial inlet and a circumferential outlet with an impeller chamber therebetween, a pump impeller in said impeller chamber encased in said pump part, the motor of said unit driving said impelled in the impeller chamber to propel fluids from the inlet of said pump part through the outlet thereof into said pumping chamber, and means for detachably connecting the casing and unit with the outlet of the pump part surrounded by and in registration with the pumping chamber of the casing whereby the lesser diameter unit may be plugged into and removed from the casing and may be passed through a small diameter access hole in a tank or the like.

15. An aircraft wing and tank assembly which comprises a hollow wing, a tank mounted in said wing having opposed top and bottom walls, a filler opening in the top wall of the tank, a pump casing having a central opening therethrough and an annular volute chamber surrounding said opening in communication therewith, means mounting the pump casing on the bottom wall of the tank under said filler opening, a pump and motor unit detachably carried by said casing and sized for insertion through said filler opening, said unit including a pump part sized for snugly fitting in the central opening of said pump casing and having an inlet for receiving fluid from the tank and an outlet registering with the volute chamber of the casing, cooperating coupling parts on the unit and casing accessible through said filler opening in the tank for detachably uniting the unit to the casing whereby the unit can be replaced without draining the contents of the tank, and means on said unit adapted to be engaged by a tool manipulated from the filler opening for insertion and removal of the unit.

16. A pump assembly which comprises a pump carrier having a pump receiving opening, a pumping chamber surrounding said opening in communication therewith, and a discharge outlet extending from said pumping chamber, means for mounting said carrier on a wall of a tank to position the opening in full communication with the contents of the tank, a pump of lesser diameter than said pump carrier detachably plugged in the opening of said carrier and having an impeller discharging into said pumping chamber, and said pump having vent means upstream from the pumping chamber adapted to accommodate the passage of fluid out of the pump to prevent the pump from becoming gas-bound.

17. A plug-in pump assembly comprising a casing having a chamber for receiving a pump, a pumping chamber in communication with the first-mentioned chamber and having a discharge outlet and means for mounting the casing on a wall of a tank, a pump and motor unit having a pump body fitting in said first-mentioned chamber and having a ring of diffuser vanes providing passages therebetween registering with the pumping chamber of the casing to direct fluid into the pumping chamber, said pump body having an inlet for receiving fluid from the tank on which the casing is mounted together with an impeller chamber receiving fluid from said inlet and registering with the passages between the diffuser vanes, a pump impeller driven by the motor of said unit and mounted in said impeller chamber to pump fluid from the inlet to the diffuser vanes and thence into the pumping chamber for discharge through the outlet of the pumping chamber, said body surrounding and protecting said impeller from damage, and means for detachably connecting the casing and unit whereby the unit can be plugged into and removed from the casing.

References Cited in the file of this patent

UNITED STATES PATENTS

| | | |
|---|---|---|
| 1,345,895 | Seguin | July 6, 1920 |
| 2,381,834 | Meredew et al. | Aug. 7, 1945 |
| 2,384,254 | Meredew | Sept. 4, 1945 |
| 2,450,143 | Howard et al. | Sept. 28, 1948 |
| 2,552,264 | Edwards | May 8, 1951 |
| 2,581,828 | Adams | Jan. 8, 1952 |
| 2,700,344 | Schellens | Jan. 25, 1955 |
| 2,704,516 | Mock et al. | Mar. 22, 1955 |
| 2,780,999 | Compton et al. | Feb. 12, 1957 |

FOREIGN PATENTS

| | | |
|---|---|---|
| 487,686 | Germany | Dec. 12, 1929 |
| 574,140 | Great Britain | Dec. 21, 1945 |
| 577,164 | Great Britain | May 7, 1946 |
| 608,121 | Great Britain | Sept. 9, 1948 |
| 941,846 | France | Jan. 21, 1949 |
| 1,013,991 | France | Mar. 14, 1952 |